(12) United States Patent
Meng et al.

(10) Patent No.: US 12,416,068 B2
(45) Date of Patent: Sep. 16, 2025

(54) HIGH-STRENGTH AND HIGH-DAMPING ALUMINUM-ZINC BIMETAL ALLOY AND PREPARATION METHOD THEREOF

(71) Applicant: Zhongkai University of Agriculture and Engineering, Guangzhou (CN)

(72) Inventors: Xianna Meng, Guangzhou (CN); Zhipeng Wen, Guangzhou (CN); Yi Wang, Guangzhou (CN); Lixing Ding, Guangzhou (CN)

(73) Assignee: Zhongkai University of Agriculture and Engineering, Guangzhou (CN)

( * ) Notice: Subject to any disclaimer, the term of this patent is extended or adjusted under 35 U.S.C. 154(b) by 0 days.

(21) Appl. No.: 18/755,223

(22) Filed: Jun. 26, 2024

(65) Prior Publication Data

US 2025/0051881 A1     Feb. 13, 2025

(30) Foreign Application Priority Data

Aug. 9, 2023  (CN) .......................... 202310995000.9

(51) Int. Cl.
| | | |
|---|---|---|
| *C22C 1/08* | (2006.01) | |
| *C22C 18/04* | (2006.01) | |
| *C22F 1/16* | (2006.01) | |
| *B33Y 80/00* | (2015.01) | |

(52) U.S. Cl.
CPC .............. *C22C 1/083* (2023.01); *C22C 18/04* (2013.01); *C22F 1/165* (2013.01); *B33Y 80/00* (2014.12)

(58) Field of Classification Search
CPC .......... B22F 10/20; B22F 10/64; C22C 1/083; C22C 18/04; C22C 21/10; C22C 1/02; C22C 1/026; C22C 1/08; C22F 1/165; B22D 23/04
See application file for complete search history.

(56) References Cited

FOREIGN PATENT DOCUMENTS

| | | |
|---|---|---|
| CN | 1480542 A | 3/2004 |
| CN | 106222507 A | 12/2016 |
| CN | 114749679 A | 7/2022 |
| CN | 116555629 A | 8/2023 |
| GB | 1326777 A | 8/1973 |
| JP | 2007217715 A | 8/2007 |
| WO | 2014207776 A1 | 12/2014 |

OTHER PUBLICATIONS

He-Fa Chent, "Study on damping properties of foamed aluminum alloy by process sum method," Journal of Materials Science and Engineering, Aug. 20, 2003, p. 521-523, No. 04, vol. 21, Related claims: 1-10 (abstract translated).

Office action dated Dec. 11, 2023 in SIPO application No. 202310995000.9.

(Continued)

*Primary Examiner* — Nicholas A Wang
(74) *Attorney, Agent, or Firm* — Piloff Passino & Cosenza LLP; Rachel K. Piloff; Sean A. Passino

(57) ABSTRACT

A high-strength and high-damping Al—Zn bimetal alloy and a preparation method thereof are provided in the present application, belonging to the field of bimetal alloy materials. The high-strength and high-damping Al—Zn bimetal is obtained from an Al alloy and a Zn alloy or Zn; the bimetal is structured by an Al alloy skeleton and its embedded Zn alloy; the alloy material has the high strength of an Al alloy and the high damping performance of a Zn alloy.

5 Claims, 3 Drawing Sheets

(56) References Cited

OTHER PUBLICATIONS

Notification to Grant Patent dated Feb. 5, 2024 in SIPO application No. 202310995000.9.
First Search Report dated Dec. 8, 2023 in SIPO application No. 202310995000.9.
Supplementary Search Report dated Jan. 30, 2024 in SIPO application No. 202310995000.9.

HIGH-STRENGTH AND HIGH-DAMPING ALUMINUM-ZINC BIMETAL ALLOY AND PREPARATION METHOD THEREOF

CROSS-REFERENCE TO RELATED APPLICATIONS

This application claims priority to Chinese Patent Application No. 202310995000.9, filed on Aug. 9, 2023, the contents of which are hereby incorporated by reference.

TECHNICAL FIELD

The present application belongs to the field of bimetal alloy materials, and in particular to a high-strength and high-damping aluminum-zinc (Al—Zn) bimetal alloy and a preparation method thereof.

BACKGROUND

Owning to the high strength and high plasticity, traditional 7xxx-series alloys, 6xxx-series alloys, 2xxx-series alloys and others have been extensively used in industries such as national defence and military industries. However, the applications in aerospace, defence and military industries of those alloys have been limited by their low damping performance (internal dissipation value <0.01). In contrast, traditional Zn and alloys thereof have been widely used in the manufacture of damper products for their excellent damping properties (internal consumption value >0.01), yet their strength is extremely low, which restricts their application in the industries of aerospace, defence and military industries. Therefore, there is a research hotspot and difficulty in the alloy industry as to develop a bimetal with the strength characteristics of aluminium alloy and the high damping characteristics of zinc alloy simultaneously.

SUMMARY

The present application provides a high-strength and high-damping aluminum-zinc (Al—Zn) bimetal alloy and a preparation method thereof. By taking advantage of the high strength property of Al alloy and the high damping property of Zn alloy, a bimetal alloy material is developed with combined properties of the two alloys, and the bimetal material is endowed with high strength and high damping properties.

In order to achieve the above objectives, the technical schemes adopted by the present application are as follows.

One of the technical schemes adopted by the present application provides a high-strength and high-damping Al—Zn bimetal alloy, prepared using Al alloy and Zn alloy, or prepared using Al alloy and pure Zn metal.

Optionally, the Al alloy is selected from Al—Zn—Mg alloy, Al—Mg—Si alloy, Al—Cu—Mg alloy or Al—Li—Cu alloy; the Zn alloy is selected from Zn—Al alloy, and the Zn—Al alloy is selected from Zn-20Al, Zn-27Al, Zn-40Al or Zn-50Al.

Another technical scheme provided by the present application provides a preparation method of the high-strength and high-damping Al—Zn bimetal alloy, where the preparation method includes using an Al alloy foam metal material as a substrate, infiltrating a Zn alloy melt or a Zn pure metal melt into the substrate by means of impregnation to obtain a bimetal billet, and densifying the bimetal billet by hot-rolling or extruding to obtain the high-strength and high-damping Al—Zn bimetal alloy.

Optionally, a method of using the Al alloy foam metal material as the substrate, infiltrating the Zn alloy melt/Zn pure metal melt into the substrate by means of impregnation to obtain the bimetal billet further includes: immersing the Al alloy foam metal material in the Zn alloy melt or the Zn pure metal melt, ultrasonicating until the Zn alloy melt or Zn pure metal melt penetrates into the Al alloy foam metal material, and cooling to obtain the bimetal billet.

More optionally, a frequency of the ultrasonicating is 20-50 kilohertz (kHz) and a duration is 2-20 hours (h).

The ultrasonicating is conducted to promote the penetration of Zn alloy melt into the pores of the Al alloy foam metal material.

Optionally, a method of densifying the bimetal billet by hot-rolling to obtain the high-strength and high-damping Al—Zn bimetal alloy further includes: heating the bimetal billet and holding, followed by hot-rolling process and cooling to obtain the high-strength and high-damping Al—Zn bimetal alloy.

More optionally, the Al alloy foam metal material has a pore size of 0.1-2 milliliters (mm) and is prepared by metal 3D printing or metal foaming method.

The pore size is defined on the basis that too small pore size is detrimental to the penetration of the Zn alloy melt, and too large pore size will results in a non-uniform distribution of the Zn and Al alloys in the final high-strength and high-damping Al—Zn bimetal alloy, which will in turn deteriorate the strength and damping properties of the product.

Optionally, heating the bimetal billet and holding includes heating the bimetal billet to 300-500 degrees Celsius (° C.) and then holding for 0.5-5 h.

The heating temperature of the bimetal billet shall not be lower than the melting point of Zn alloy. The Zn alloy overflows the foam metal material when the heating temperature is higher than the melting point of Zn alloy, while the deformation resistance during hot-rolling or hot extrusion will be too strong if the heating temperature is too low, and the interface between zinc and aluminium will be low, resulting in extrusion cracking problems.

More optionally, a preparation method of the Zn alloy melt includes the following steps: heating the Zn alloy to 450-600° C. to completely melt the Zn alloy to prepare the Zn alloy melt. A preparation method of the Zn pure metal melt includes: heating a Zn pure metal to 450-600° C. to completely melt the Zn pure metal to prepare the Zn pure metal melt.

Optionally, during the densifying by hot-rolling, an initial rolling reduction is 5-10%, an intermediate rolling reduction is 40-50%, a final rolling reduction is 10-20%, and a total rolling reduction is 55-80%; while an initial rolling temperature is 400-500° C., an intermediate rolling temperature is 300-400° C., and a final rolling temperature is 200-300° C.

Rolling crack problem occurs as a result of too large amount of reduction. Therefore, the present application limits the reduction amount of the initial rolling, the intermediate rolling, and the final rolling, respectively. A higher initial rolling temperature helps to improve the plasticity of the material, so that the deformation resistance is small; while a lower final rolling temperature is convenient for obtaining a fine organisational structure, which in turn ensures the mechanical properties of the material.

Optionally, the cooling may be air cooling, water cooling or oil cooling.

More optionally, the Al alloy foam metal material is prepared by metal 3D printing or metal foaming method.

Metal 3D printing is completed by laser metal 3D printing system, where the laser metal 3D printing system includes a powder feeding laser metal 3D printing system and a powder bed laser metal 3D printing system, with a laser power of 50-300 Watts (W), a scanning speed of 5-10 millimeter per second (mm/s), a powder feeding amount of alloy powder of 1-10 grams per minute (g/min), a spot diameter of 0.05-0.2 mm, a shielding gas and powder feeding gas of argon, and flow rates of 5-15 liter per minute (L/min) and 2-10 L/min respectively.

The metal foaming method is electrodeposition, including using conductive polyurethane soft foam as a matrix, depositing aluminum alloy on a surface of a conductive polyurethane soft foam substrate under an action of direct current, and then removing polyurethane by sintering to obtain an aluminum alloy foam material.

Compared with the prior art, the present application has the following advantages and technical effects: based on the high strength characteristics of Al alloy and the high damping characteristics of Zn alloy, the foamed aluminum alloy is used as the substrate, then the substrate is completely immersed in the zinc alloy melt, the permeability of the zinc alloy is accelerated by ultrasound, and the bimetal billet of Al alloy and Zn alloy is prepared, and finally, hot-rolling densification is carried out to prepare the high-strength and high-damping Al—Zn bimetal alloy, which has both the strength of Al alloy and the high damping performance of Zn alloy and may be widely used in aerospace, defense and military industries.

BRIEF DESCRIPTION OF THE DRAWINGS

In order to explain the embodiments of the present application or the technical scheme in the prior art more clearly, the drawings needed in the embodiments are briefly introduced below. Obviously, the drawings in the following description are only some embodiments of the present application. For ordinary people in the field, other drawings may be obtained according to these drawings without paying creative labor.

DETAILED DESCRIPTION OF THE EMBODIMENTS

A number of exemplary embodiments of the present application will now be described in detail, and this detailed description should not be considered as a limitation of the present application, but should be understood as a more detailed description of certain aspects, characteristics and embodiments of the present application.

It should be understood that the terminology described in the present application is only for describing specific embodiments and is not used to limit the present application. In addition, for the numerical range in the present application, it should be understood that each intermediate value between the upper limit and the lower limit of the range is also specifically disclosed. The intermediate value within any stated value or stated range and every smaller range between any other stated value or intermediate value within the stated range are also included in the present application. The upper and lower limits of these smaller ranges can be independently included or excluded from the range.

Unless otherwise specified, all technical and scientific terms used herein have the same meaning as commonly understood by one of ordinary skill in the art to which this application relates. Although the present application only describes the preferred methods and materials, any methods and materials similar or equivalent to those described herein can also be used in the practice or testing of the present application. All documents mentioned in this specification are incorporated by reference to disclose and describe methods and/or materials related to the documents. In case of conflict with any incorporated document, the contents of this specification shall prevail.

It is obvious to those skilled in the art that many improvements and changes may be made to the specific embodiments of the present application without departing from the scope or spirit of the present application. Other embodiments will be apparent to the skilled person from the description of the application. The specification and embodiments of this application are only exemplary.

The terms "including", "comprising", "having" and "containing" used in this specification are all open terms, which means including but not limited to.

The room temperature in the present application refers to 25+/−2° C.

Figure 1:
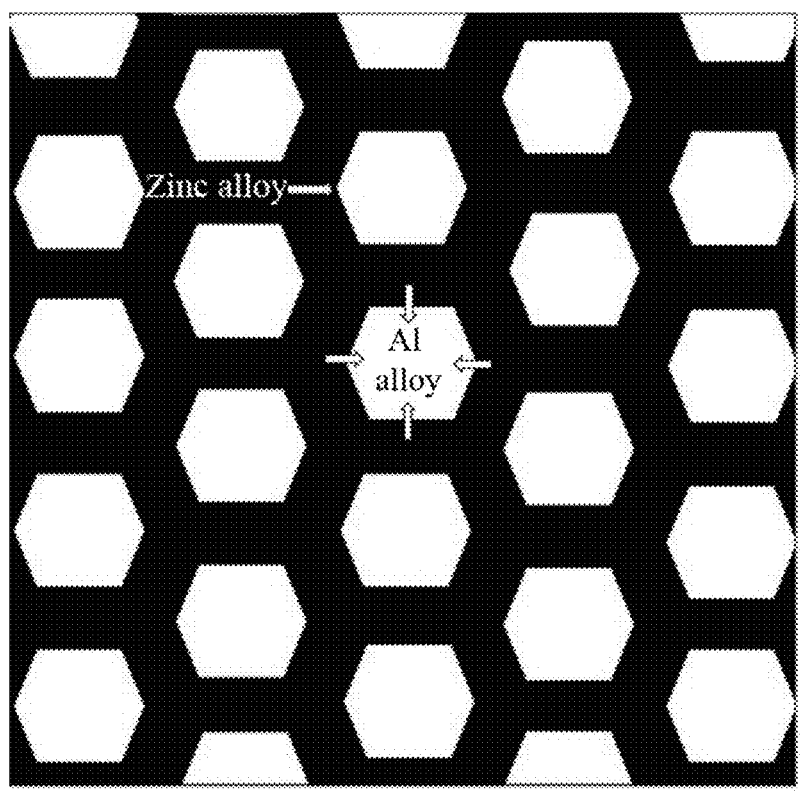
FIG. 1 is a schematic structural diagram of a high-strength and high-damping Al—Zn bimetal alloy prepared by the present application.

The embodiments of the present application provide a high-strength and high-damping Al—Zn bimetal alloy, the structural schematic diagram of which is shown in FIG. 1. The high-strength and high-damping Al—Zn bimetal alloy is prepared using Al alloy and Zn alloy, or prepared using Al alloy and pure Zn metal.

In some preferred embodiments of the present application, Al alloy is selected from Al—Zn—Mg alloy, Al—Mg—Si alloy, Al—Cu—Mg series alloy or Al—Li—Cu alloy; the Zn alloy is selected from Zn—Al alloy, and the Zn—Al series alloys are selected from Zn-20Al, Zn-27Al, Zn-40Al or Zn-50Al.

The embodiments of the present application also provides a preparation method of the high-strength and high-damping Al—Zn bimetal alloy, including the following steps: taking Al alloy foam metal material as a substrate, then completely immersing the substrate into Zn alloy melt, accelerating the Zn alloy in terms of permeability of by ultrasound, preparing a bimetal billet of Al alloy and Zn alloy, and finally carrying out hot-rolling densification to obtain the high-strength and high-damping Al—Zn bimetal alloy. Specifically, the preparation method includes the following steps:

S1, immersing an Al alloy foam metal material in a Zn alloy melt, followed by ultrasonicating until the Zn alloy melt penetrates into the Al alloy foam metal material, and cooling to obtain a bimetal billet; and S2, heating the bimetal billet and holding, followed by hot-rolling and cooling to obtain a high-strength and high-damping Al—Zn bimetal alloy.

In some preferred embodiments of the present application, pores of the Al alloy foam metal material have sizes ranging from 0.1 to 2 milliliters (mm).

In some preferred embodiments of the present application, commercial Al alloy foam metal materials are prepared by metal 3D printing or metal foaming, or by electrolysis method.

In some preferred embodiments of the present application, a preparation method of the Zn alloy melt includes: heating Zn alloy to 450-600° C. to completely melt Zn alloy to prepare Zn alloy melt.

The objective of ultrasonicating is to promote the penetration of Zn alloy melt into the pores of Al alloy foam metal materials, so in some preferred embodiments of the present application, a frequency of the ultrasonicating is 20-50 kilohertz (kHz) and a duration is 2-20 hours (h).

The heating temperature of bimetal billet shall not be lower than the melting point of Zn alloy. If the heating temperature is higher than the melting point of Zn alloy, Zn alloy will overflow the foam metal material. If the heating temperature is too low, it will lead to great thermal deformation resistance and easy deformation cracks. Therefore, in some preferred embodiments of the present application, the heating and holding includes heating the bimetal billet to 300-500° C. and then holding for 0.5-5 h.

In some preferred embodiments of the present application, the initial rolling reduction during hot-rolling is 5-10%, the reduction during intermediate rolling is 40-50%, the reduction during final rolling is 10-20%, and the total reduction is 55-80%. The initial rolling temperature is 400-500° C., the intermediate rolling temperature is 300-400° C., and the final rolling temperature is 200-300° C.

In some preferred embodiments of the present application, the cooling may be air cooling or water cooling. Experiments show that air cooling or water cooling has no significant influence on product performance, and the typical but non-limiting cooling mode in the embodiments of the present application is air cooling.

In some preferred embodiments of the present application, metal 3D printing is completed by a laser metal 3D printing system; the process parameters of the lase metal 3D printing are adjusted according to requirement, and the laser metal 3D printing system includes a powder feeding laser metal 3D printing system and a powder bed laser metal 3D printing system; the process parameters include laser waveform, spot diameter, peak power, scanning speed, powder feeding amount, repetition frequency, lap ratio and duty ratio. Specific process parameters include: optimizing the laser additive manufacturing process window, and obtaining the optimized process window: laser power of 50-300 W, scanning speed of 5-10 mm/s, and Al alloy powder is selected from Al—Zn—Mg series alloy powder, Al—Mg—Si series alloy powder, Al—Cu—Zn series alloy powder or Al—Li—Cu series alloy powder, and the powder feeding amount of alloy powder is 1-10 grams per minute (g/min), the spot diameter is 0.05-0.2 mm, the shielding gas and powder feeding gas are argon, and the flow rates are 5-15 liter per minute (L/min) and 2-10 L/min respectively. The process parameters of the process window in the above steps are selected for laser additive manufacturing, and the Al alloy foam metal material with metal 3D printing is obtained.

In some preferred embodiments of the present application, the metal foaming method is electrodeposition, including depositing aluminum alloy on the surface of the conductive polyurethane soft foam substrate by using conductive polyurethane soft foam as the substrate, and then removing polyurethane by sintering, thereby obtaining the aluminum alloy foam material.

The alloys used in the embodiments are all commercially purchased electrodeposited aluminum alloy foam metallographic diagrams.

Embodiment 1

Figure 2:
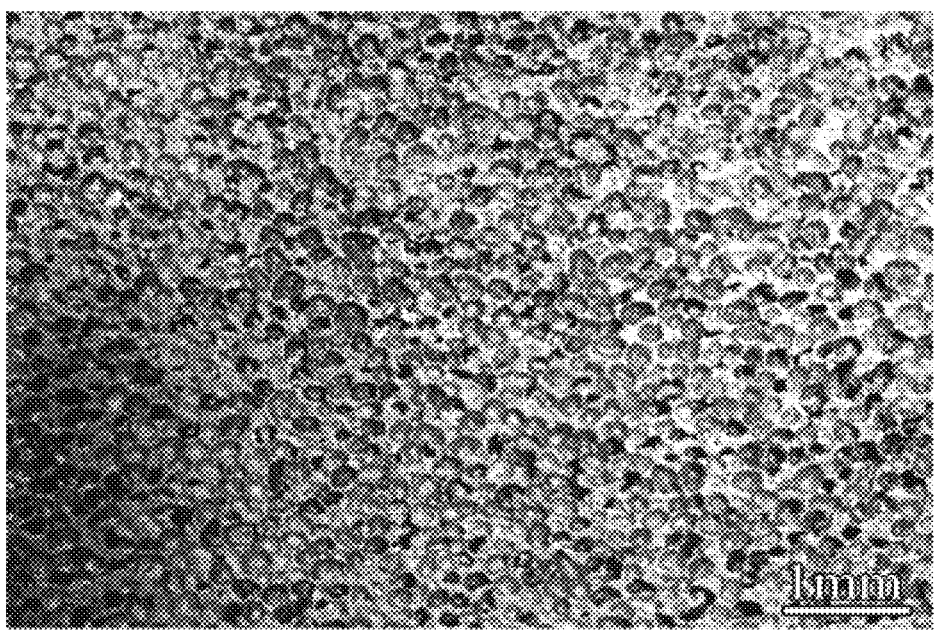
FIG. 2 is a picture of 7075 aluminum alloy foam metal and Zn-40Al bimetal billet printed by metal 3D in Embodiment 1.

S1, cleaning the surface of the 7075Al—Zn—Mg series alloy substrate by deoiling and degreasing, and preheating to 200° C. to be used as the substrate for 3D printing of the 7075alloy foam material;

S2, placing 7075Al—Zn—Mg alloy powder into the corresponding powder feeder, then starting the laser to optimize the laser additive manufacturing process window, and obtaining the optimized process parameters as: laser power of 200 W, scanning speed of 8 mm/s, powder feeding amount of alloy powder of 5 g/min, spot diameter of 0.1 mm, shielding gas and powder feeding gas both argon, and flow rates of 10 L/min and 9 L/min respectively; using the process parameters of the above process window for laser additive manufacturing, obtaining the 7075Al alloy foam metal material with metal 3D printing, where the pore size of the 7075Al alloy foam metal material is more than or equal to 20 μm, and the specific value of the pore size may be set according to the 3D printing process;

S3, completely immersing the 7075Al alloy foam metal material in the molten Zn-40Al alloy of 650° C., then starting the power supply of the ultrasonicating, and carrying out the ultrasonic penetration promotion treatment with the ultrasonicating frequency of 35 kHz and the ultrasonicating duration of 5 h, and obtaining the 7075/Zn-40Al bimetal billet after air cooling, where the metallographic picture of the 7075Al alloy foam metal and the Zn-40Al bimetal billet printed by Metal 3D are illustrated in FIG. 2; and S4, heating the 7075/Zn-40Al bimetal billet to 450° C., holding for 2 h, and then carrying out hot-rolling treatment to prepare a bimetal plate, where the hot-rolling process parameters are as follows: 8% of initial rolling reduction, 40% of intermediate rolling reduction and 15% of final rolling reduction, and the total reduction is 63%; the initial rolling temperature is 450° C., the intermediate rolling temperature is 350° C., the final rolling temperature is 250° C., and the final rolled sample is air-cooled to obtain the high-strength and high-damping Al—Zn bimetal alloy.

Embodiment 2

S1, cleaning the surface of the 7075Al—Zn—Mg series alloy substrate by deoiling and degreasing, and preheating to 200° C.;

S2, placing 7075Al—Zn—Mg alloy powder into the corresponding powder feeder, then starting the laser to optimize the laser additive manufacturing process window, and obtaining the optimized process parameters as: laser power of 50 W, scanning speed of 5 mm/s, powder feeding amount of alloy powder of 1 g/min, spot diameter of 0.05 mm, shielding gas and powder feeding gas both argon, and flow rates of 5 L/min and 2 L/min respectively; using the process parameters of the above process window for laser additive manufacturing, obtaining the 7075Al alloy foam metal material with metal 3D printing, where the pore size of the 7075Al alloy foam metal material is more than or equal to 20 μm, and the specific value of the pore size may be set according to the 3D printing process;

S3, completely immersing the 7075Al alloy foam metal material in the molten Zn-40Al alloy of 500° C., then starting the power supply of the ultrasonicating, and carrying out the ultrasonic penetration promotion treatment with the ultrasonicating frequency of 20 kHz and the ultrasonicating duration of 2 h, and obtaining the 7075/Zn-40Al bimetal billet after air cooling; and S4, heating the 7075/Zn-40Al bimetal billet to 300° C., holding for 2 h, and then carrying out hot-rolling treatment to prepare a bimetal plate, where the hot-rolling process parameters are as follows: 5% of initial rolling reduction, 40% of intermediate rolling reduction and 10% of final rolling reduction, and the total reduction is 55%; the initial rolling temperature is 400° C., the intermediate rolling temperature is 300° C., the final rolling temperature is 200° C., and the final rolled sample is air-cooled to obtain the high-strength and high-damping Al—Zn bimetal alloy.

Embodiment 3

S1, cleaning the surface of the 7075Al—Zn—Mg series alloy substrate by deoiling and degreasing, and pre-heating to 200° C.;

S2, placing 7075Al—Zn—Mg alloy powder into the corresponding powder feeder, then starting the laser to optimize the laser additive manufacturing process window, and obtaining the optimized process parameters as: laser power of 300 W, scanning speed of 10 mm/s, powder feeding amount of alloy powder of 10 g/min, spot diameter of 0.2 mm, shielding gas and powder feeding gas both argon, and flow rates of 15 L/min and 10 L/min respectively; using the process parameters of the above process window for laser additive manufacturing, obtaining the 7075Al alloy foam metal material with metal 3D printing, where the pore size of the 7075Al alloy foam metal material is more than or equal to 20 μm, and the specific value of the pore size may be set according to the 3D printing process;

S3, completely immersing the 7075Al alloy foam metal material in the molten Zn-40Al alloy of 600° C., then starting the power supply of the ultrasonicating, and carrying out the ultrasonic penetration promotion treatment with the ultrasonicating frequency of 50 kHz and the ultrasonicating duration of 8 h, and obtaining the 7075/Zn-40Al bimetal billet after air cooling; and S4, heating the 7075/Zn-40Al bimetal billet to 500° C., holding for 2 h, and then carrying out hot-rolling treatment to prepare a bimetal plate, where the hot-rolling process parameters are as follows: 10% of initial rolling reduction, 50% of intermediate rolling reduction and 20% of final rolling reduction, and the total reduction is 80%; the initial rolling temperature is 500° C., the intermediate rolling temperature is 400° C., the final rolling temperature is 300° C., and the final rolled sample is air-cooled to obtain the high-strength and high-damping Al—Zn bimetal alloy.

Embodiment 4

The difference of the present embodiment with Embodiment 1 is that the laser power in S2 is 100 W, the scanning speed is 6.5 mm/s, the powder feeding amount of alloy powder is 3 g/min, the spot diameter is 0.08 mm, the shielding gas and powder feeding gas are argon, and the flow rates are 7 L/min and 4 L/min respectively; in S3, the ultrasonicating frequency is 25 kHz and the ultrasonic duration is 5 h; in S4, the 7075/Zn-40Al bimetal billet is heat to 350° C., and held for 2 h; the hot-rolling process parameters are as follows: 6.5% of initial rolling reduction, 42% of intermediate rolling reduction and 12% of final rolling reduction, and the total reduction is 60.5%; the initial rolling temperature is 420° C., the intermediate rolling temperature is 320° C., the final rolling temperature is 220° C.

Embodiment 5

The difference of the present embodiment with Embodiment 1 is that the laser power in S2 is 250 W, the scanning speed is 9 mm/s, the powder feeding amount of alloy powder is 8 g/min, the spot diameter is 0.15 mm, the shielding gas and powder feeding gas are argon, and the flow rates are 12 L/min and 8 L/min respectively; in S3, the ultrasonicating frequency is 25 kHz and the ultrasonic duration is 5 h; in S4, the 7075/Zn-40Al bimetal billet is heat to 350° C., and held for 2 h; the hot-rolling process parameters are as follows: 8.5% of initial rolling reduction, 48% of intermediate rolling reduction and 18% of final rolling reduction, and the total reduction is 74.5%; the initial rolling temperature is 480° C., the intermediate rolling temperature is 380° C., the final rolling temperature is 280° C.

Embodiment 6

As in Embodiment 1, the difference is only in the replacement of the 7075Al—Zn—Mg alloy powder with a 2014-series Al—Cu—Zn series alloy powder.

Embodiment 7

As in Embodiment 1, the difference is only in the replacement of the 7075Al—Zn—Mg alloy powder with a 6061-series Al—Mg—Si series alloy powder.

Embodiment 8

S1, deoiling and degreasing the electrodeposited aluminum alloy foam material purchased in the market, and drying to obtain an aluminum alloy foam base material;

S2, completely immersing the aluminum alloy foam material obtained in S1 into the molten Zn-40Al alloy of 600° C., then starting the power supply of the ultrasonicating, carrying out ultrasonic penetration promotion treatment with the ultrasonicating frequency of 50 kHz and the ultrasonic duration of 8 h, and obtaining an aluminum alloy/Zn-40Al bimetal billet after air cooling; and S3, heating the aluminum alloy/Zn-40Al bimetal billet to 500° C., holding for 2 h, and then carrying out hot-rolling treatment to prepare a bimetal plate, where the hot-rolling process parameters are as follows: 10% of initial rolling reduction, 50% of intermediate rolling reduction and 20% of final rolling reduction, and the total reduction is 80%; the initial rolling temperature is 500° C., the intermediate rolling temperature is 400° C., and the final rolling temperature is 300° C. The final rolled sample is air-cooled to obtain a high-strength and high-damping Al—Zn bimetal alloy.

Comparative Embodiment 1

Market purchased 7075, 6061 and 2014 alloy plates are used for comparison.

Comparative Embodiment 2

Pure aluminum and pure zinc are used to melt Zn-40Al, Zn-10Al alloys and metallic Zn, respectively, and cast billets are prepared, which are then rolled into the desired sheets using conventional processes.

Comparative Embodiment 3

The difference of the present embodiment with Embodiment 1 is that the process parameters of the process window in S2 are: laser power of 200 W, scanning speed of 8 mm/s, powder feeding amount of alloy powder of 5 g/min, spot diameter of 0.1 mm, shielding gas and powder feeding gas of 10 L/min and 9 L/min respectively. The process parameters of the above process window are selected for laser additive manufacturing, and the 7075 series Al alloy foam metal material with metal 3D printing is obtained, and the pore size is 2.5 mm by adjusting the scanning path.

Comparative Embodiment 4

The difference of the present embodiment with Embodiment 1 is that the process parameters of the art window in S2 are: laser power of 100 W, scanning speed of 5 mm/s, powder feeding amount of alloy powder of 3 g/min, spot diameter of 0.1 mm, shielding gas and powder feeding gas of 5 L/min and 4 L/min respectively. The process parameters of the above process window are selected for laser additive manufacturing, and the 7075 series Al alloy foam metal material with metal 3D printing is obtained with the pore size of 0.08 mm.

Comparative Embodiment 5

As compared with the Embodiment 1, the difference of the present embodiment is that the hot-rolling process parameters in the S4 are as follows: 48% of initial rolling reduction, 15% of final rolling reduction, and the total reduction is 63%; the initial rolling temperature is 450° C., and the final rolling temperature is 250° C. The final rolled sample is air-cooled to obtain a high-strength and high-damping Al—Zn bimetal alloy.

Comparative Embodiment 6

As compared with the Embodiment 1, the difference of the present embodiment is that the hot-rolling process parameters in the S4 are as follows: 48% of initial rolling reduction, 15% of final rolling reduction, and the total reduction is 63%; the initial rolling temperature is 350° C., and the final rolling temperature is 250° C. The final rolled sample is air-cooled to obtain a high-strength and high-damping Al—Zn bimetal alloy.

Comparative Embodiment 7

As compared with the Embodiment 1, the difference of the present embodiment is that the hot-rolling process parameters in the S4 are as follows: 8% of initial rolling reduction, 55% of final rolling reduction, and the total reduction is 63%; the initial rolling temperature is 450° C., and the final rolling temperature is 350° C. The final rolled sample is air-cooled to obtain a high-strength and high-damping Al—Zn bimetal alloy.

Comparative Embodiments 8-10

As compared with the Embodiment 1, the difference is that the total reduction is 63% for Comparative embodiments 8, 9 and 10, where the hot-rolling is carried out using the same initial, intermediate and final rolling temperatures as in Embodiment 1, respectively.

Performance Test

The mechanical properties and damping properties of the products obtained in embodiments and comparative embodiments are tested as follows: mechanical properties test: the mechanical properties of various alloys are tested by uniaxial tensile test. The test equipment is Instron 3369 electronic tensile testing machine, and the strain rate is $1\times10^{-2}$/s, and the engineering stress-strain curve is obtained. According to the stress-strain curve, the mechanical properties of the material are obtained.

Damping performance test: the room temperature damping performance of various alloys is tested by dynamic damping tester. The damping test strain amplitude is $1\times10^{-4}$, the test frequency is 1-10 Hz, the test temperature is 25-300° C., and the heating rate is 5° C./min. Through the curve of temperature and internal friction factor, the damping performance of materials at room temperature, that is, internal friction factor, is obtained. The internal friction factor is lower than 0.01 as a low damping material and higher than 0.01 as a high damping material. The higher the internal friction factor, the better the damping performance. The test results are shown in Table 1.

TABLE 1

| | Tensile strength | Yield strength | Elongation after breaking | Internal loss factor |
|---|---|---|---|---|
| Embodiment 1 | 568.9 | 497.6 | 13.6 | 0.031 |
| Embodiment 2 | 498.6 | 401.5 | 5.6 | 0.021 |
| Embodiment 3 | 501.8 | 413.4 | 6.1 | 0.026 |
| Embodiment 4 | 553.6 | 441.5 | 10.8 | 0.021 |
| Embodiment 5 | 549.4 | 439.8 | 10.1 | 0.025 |
| Embodiment 6 | 538.6 | 419.8 | 11.6 | 0.028 |
| Embodiment 7 | 457.3 | 389.6 | 21.3 | 0.024 |
| Comparative embodiment 1 (7075) | 539.6 | 456.3 | 12.6 | 0.004 |
| Comparative embodiment 1 (6061) | 464.3 | 401.3 | 23.6 | 0.004 |
| Comparative embodiment 1 (2014) | 528.9 | 439.6 | 9.8 | 0.003 |
| Comparative embodiment 2 (Zn—40Al) | 319.3 | 226.3 | 4.9 | 0.019 |
| Comparative embodiment 2 (Zn—10Al) | 246.3 | 201.4 | 3.8 | 0.022 |
| Comparative embodiment 2 (Zn) | 226.4 | 189.6 | 3.3 | 0.028 |
| Comparative embodiment 3 | 341.6 | 288.4 | 5.6 | 0.022 |
| Comparative embodiment 4 | 309.1 | 231.3 | 2.6 | 0.038 |
| Comparative embodiment 5 | 446.3 | 388.6 | 5.89 | 0.018 |
| Comparative embodiment 6 | 499.6 | 401.3 | 8.6 | 0.018 |
| Comparative embodiment 7 | 516.8 | 446.2 | 10.6 | 0.021 |
| Comparative embodiment 8 | 456.5 | 374.6 | 6.8 | 0.019 |
| Comparative embodiment 9 | 421.8 | 356.2 | 5.1 | 0.015 |
| Comparative embodiment 10 | 378.6 | 336.1 | 3.6 | 0.011 |

According to the industry, when the tensile strength of aluminum alloy is greater than 500 MPa, the alloy is a high-strength aluminum alloy, and the strength of Al—Zn bimetal alloy prepared in Embodiments 1-8 of the present application meets the above requirements. As illustrated in Table 1, even though the strength of the alloys obtained in Embodiments 2, 3, 6, and 7 is slightly less than that of Comparative embodiment 1 (7075), but the above requirements are met, the damping strength of the alloys obtained in the above embodiments is significantly improved as compared to that of Comparative embodiment 1 (7075). Even though the damping strength of the alloys obtained in Embodiments 2 and 4 is slightly lower than that in Comparative embodiment 2 (Zn-10Al), the strength of the alloys obtained in Embodiments 2 and 4 is obviously better than that in Comparative embodiment 2. Even though the damping strength of the alloys obtained in Embodiments 2, 3, 4 and 5 are slightly lower than that of Comparative embodiment 2 (Zn), the strength of the alloys obtained in Embodiments 2, 3, 4 and 5 is obviously better than that of Comparative embodiment 2 (Zn). By comprehensive comparison, the alloy obtained in this present application has both the strength of Al alloy and the high damping performance of Zn alloy, which has achieved the technical effect of obviously improving the comprehensive performance.

Compared with Embodiment 1, Comparative embodiment 1 is a traditional 7075Al alloy, and its tensile strength, yield strength, elongation after breaking and damping properties are lower than those of the bimetal alloy in Embodiment 1.

Compared with Embodiment 1, Comparative embodiment 2 is a traditional 6xxx series aluminum alloy, and its tensile strength, yield strength and damping performance are lower than those of the bimetal alloy in Embodiment 1.

Compared with Embodiment 1, the pore size of Al alloy foam prepared by Comparative embodiment 3 is too large, which leads to the increase of Zn content in bimetal alloy and the decrease of tensile strength, yield strength and elongation after breaking. At the same time, the larger pore size means that the interface density of zinc alloy/aluminum alloy decreases, the interface damping performance decreases, and the final damping performance also decreases.

Compared with Embodiment 1, the pore sizes of Al alloy foam metal material prepared in Comparative embodiment 4 is too small, which makes it difficult for zinc melt to penetrate into the pores, so there are a lot of pores in the prepared bimetal alloy, and the tensile strength, yield strength and elongation after breaking of the alloy are greatly reduced, but the damping performance is excellent, so it is still difficult to achieve the purpose of high strength and high damping.

Figure 3:
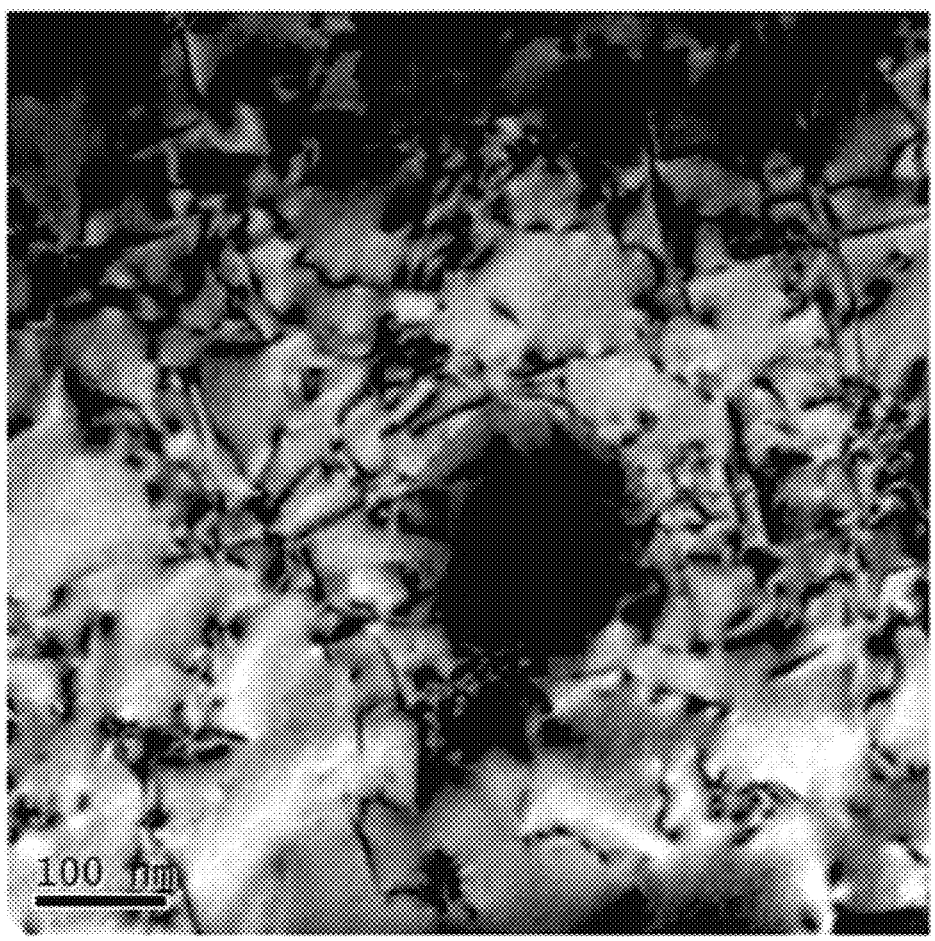
FIG. 3 is a Transmission Electron Microscope (TEM) diagram of the interaction between the precipitated phase and dislocation of the aluminum alloy matrix obtained in Comparative embodiment 9.

Compared with Embodiment 1, the hot-rolling process is adjusted in Comparative embodiments 5-10 during the hot-rolling process, resulting in coarse organization, rolling cracks, or the presence of a high density of dislocations, etc., which makes it difficult to achieve the design purpose of high strength and high damping. FIG. 3 is the TEM diagram of the interaction between the precipitated phase and dislocation in the aluminum alloy matrix obtained in Comparative embodiment 9. It is observed from FIG. 3 that due to the changes in the hot-rolling process, a high density of dislocations in the aluminum alloy matrix exists in the TEM morphology, and the high density of dislocations reduces the dislocation damping properties of the alloy, thus resulting in a low damping performance.

The above-mentioned embodiments only describe the preferred mode of the present application, and do not limit the scope of the present application. Under the premise of not departing from the design spirit of the present application, various modifications and improvements made by ordinary technicians in the field to the technical scheme of the present application shall fall within the protection scope determined by the claims of the present application.

What is claimed is:

1. A Al—Zn alloy prepared using Al alloy and Zn alloy, or prepared using Al alloy and Zn pure metal; wherein
   the Al alloy is selected from Al—Zn—Mg alloy, Al—Mg—Si alloy, Al—Cu—Mg alloy or Al—Li—Cu alloy;
   the Zn alloy is selected from Zn—Al alloy; and the Zn—Al alloy is selected from Zn-20Al, Zn-27Al, Zn-40Al or Zn-50Al;
   a preparation method of the Al—Zn alloy comprises following steps: taking Al alloy foam metal material as a substrate, infiltrating Zn alloy melt or Zn pure metal melt into the substrate by impregnation to obtain a billet, and densifying the billet by hot-rolling or extruding to obtain the Al—Zn alloy;
   the Al alloy foam metal material has a pore size of 0.1-2 mm and is prepared by metal 3D printing or metal foaming method; and
   in the densifying by hot-rolling, an initial rolling reduction is 5-10%, an intermediate rolling reduction is 40-50%, a final rolling reduction is 10-20%, and a total rolling reduction is 55-80%; an initial rolling temperature is 400-500° C., an intermediate rolling temperature is 300-400° C., and a final rolling temperature is 200-300° C.

2. The Al—Zn alloy according to claim 1, wherein a method of using the Al alloy foam metal material as the substrate, infiltrating the Zn alloy melt/Zn pure metal melt into the substrate by impregnation to obtain the billet further comprises:
   immersing the Al alloy foam metal material in the Zn alloy melt or the Zn pure metal melt, ultrasonicating until the Zn alloy melt or Zn pure metal melt penetrates into the Al alloy foam metal material, and cooling to obtain the billet.

3. The Al—Zn alloy according to claim 1, wherein a method of densifying the billet by hot-rolling to obtain the Al—Zn alloy further comprises:
   heating the billet and holding, followed by hot-rolling process and cooling to obtain the Al—Zn alloy.

4. The Al—Zn alloy according to claim 1, wherein a preparation method of the Zn alloy melt comprises following steps: heating the Zn alloy to 450-600° C. to completely melt the Zn alloy to prepare the Zn alloy melt.

5. The Al—Zn alloy according to claim 1, wherein a preparation method of the Zn pure metal melt comprises: heating the Zn pure metal to 450-600° C. to completely melt the Zn pure metal to prepare the Zn pure metal melt.

* * * * *